United States Patent
Lin et al.

(10) Patent No.: US 8,514,803 B2
(45) Date of Patent: Aug. 20, 2013

(54) NON-COHERENT DETECTION METHOD OF THE NUMBER OF TRANSMIT ANTENNA PORTS FOR OFDMA

(75) Inventors: Tao Lin, Victoria (AU); Boon Loong Ng, Victoria (AU)

(73) Assignee: NEC Corporation, Tokyo (JP)

( * ) Notice: Subject to any disclaimer, the term of this patent is extended or adjusted under 35 U.S.C. 154(b) by 152 days.

(21) Appl. No.: 13/148,493

(22) PCT Filed: Feb. 5, 2010

(86) PCT No.: PCT/JP2010/052110
§ 371 (c)(1),
(2), (4) Date: Sep. 23, 2011

(87) PCT Pub. No.: WO2010/093028
PCT Pub. Date: Aug. 19, 2010

(65) Prior Publication Data
US 2012/0008576 A1    Jan. 12, 2012

(30) Foreign Application Priority Data
Feb. 10, 2009  (AU) .............. 2009900530

(51) Int. Cl.
*H04W 4/00* (2009.01)
(52) U.S. Cl.
USPC ........................................ 370/329; 370/334
(58) Field of Classification Search
USPC ............... 370/310–350, 464–465; 375/260
See application file for complete search history.

(56) References Cited

U.S. PATENT DOCUMENTS

| | | | | |
|---|---|---|---|---|
| 8,295,381 | B2 * | 10/2012 | Mohammed et al. | 375/267 |
| 2006/0205356 | A1 * | 9/2006 | Laroia et al. | 455/66.1 |
| 2007/0140106 | A1 * | 6/2007 | Tsai et al. | 370/208 |
| 2010/0041355 | A1 * | 2/2010 | Laroia et al. | 455/129 |

FOREIGN PATENT DOCUMENTS

| | | |
|---|---|---|
| JP | 2006-101035 A | 4/2006 |
| JP | 2006-211727 A | 8/2006 |
| JP | 2006-333088 A | 12/2006 |
| JP | 2007-060116 A | 3/2007 |
| JP | 2008-017144 A | 1/2008 |
| JP | 2008-118309 A | 5/2008 |
| WO | WO-2007-135733 A1 | 11/2007 |

OTHER PUBLICATIONS

3GPP TS36.212 V8.5.0 (Dec. 2008), 3rd Generation Partnership Project; Technical Specification Group Radio Access Network; Evolved Universal Terrestrial Radio Access (E-UTRA); Multiplexing and channel coding (Release 8).

(Continued)

*Primary Examiner* — Warner Wong
(74) *Attorney, Agent, or Firm* — Dickstein Shapiro LLP (57) ABSTRACT

A method of non-coherent detection of the number of cell-specific transmit antenna ports for a communications device, includes the steps of, at the communications device: (a) generating a downlink reference signals (RS) sequence replica; (b) for a first possible transmit antenna port only, determining a downlink system bandwidth from non-coherent correlation of the generated downlink RS sequence replica and received RS samples; (c) at the determined downlink system, performing a correlation of the generated downlink RS sequence replica and received RS samples for each of a plurality of possible transmit antenna ports; and (d) determining the number of transmit antennas from a comparison of the correlation results in step (c).

12 Claims, 6 Drawing Sheets

(56) References Cited

OTHER PUBLICATIONS

3GPP TS36.211 V8.5.0 (Dec. 2008), 3rd Generation Partnership Project; Technical Specification Group Radio Access Network; Evolved Universal Terrestrial Radio Access (E-UTRA); Physical Channels and Modulation (Release 8).

International Search Report issued for PCT/JP2010/052110, mail date Apr. 27, 2010.

3GPP TS36.212 V8.5.0 (Dec. 2008), 3rd Generation Partnership Project; Technical Specification Group Radio Access Network; Evolved Universal Terrestrial Radio Access (E-UTRA); Multiplexing and channel coding (Release 8). (fifty-eight (58) pages total).

* cited by examiner

NON-COHERENT DETECTION METHOD OF THE NUMBER OF TRANSMIT ANTENNA PORTS FOR OFDMA

PRIORITY CLAIM

Priority is claimed on Australian Provisional Patent Application No. 2009900530, filed Feb. 10, 2009, the content of which is incorporated herein by reference.

TECHNICAL FIELD

The present invention relates generally to orthogonal frequency division multiple access (OFDMA) communications system such as the Long Term Evolution (LTE) communication system, and in particular to the determination by a communication device such as User Equipment (UE) forming part of an LTE communication system of the number of cell-specific antenna, ports of the serving cell in communication with the UE.

BACKGROUND ART

In OFDMA systems such as the LTE system, in general the number of cell specific antenna ports of the serving cell is implicitly signaled to the UE via the Physical Broadcast Channel (PBCH) cyclic redundancy check (CRC) mask, as defined in the third generation partnership project (3GPP) technical specification 36.212. However, to successfully receive the PBCH, the UE needs to determine the number of cell-specific antenna ports. Since the information adds to the number of cell-specific antenna ports can only be known to the UE via a successful confirmation of a CRC check sum on PBCH data, an unresolvable circular problem exists.

One way to circumvent this problem is to perform a series of hypothesis testing by repeatedly attempting to receive the PBCH based on different assumptions about the number of cell-specific antenna ports. If the hypothesis testings are done sequentially, the latency in the communication may exceed desired limits. If the hypothesis testings are done in parallel though, then additional signal processing modules are required, resulting in an increased chip size and excessive power consumption.

DISCLOSURE OF INVENTION

Accordingly, there exists a need to provide a method for reliably detecting the number of cell-specific antenna ports in an OFDMA communication system, independently of PBCH processing. There also exists a need to provide a method of detecting the number of cell-specific antenna ports in an OFDMA system which ameliorates or overcomes one or more problems or inconveniences of existing cell-specific antenna port detection methods.

With this in mind, one aspect of the invention provides a method of non-coherent detection of the number of cell-specific transmit antenna ports for a communications device, the method including the steps of at the communications device:

(a) generating a downlink reference signals (RS) sequence replica;

(b) for a first possible transmit antenna port only, determining a downlink system bandwidth from non-coherent correlation of the generated downlink RS sequence replica and received RS samples;

(c) at the determined downlink system, performing a correlation of the generated downlink RS sequence replica and received RS samples for each of a plurality of possible transmit antenna ports; and (d) determining the number of transmit antennas from a comparison of the correlation results in step (c).

The RS sequence replica may be generated in step (a) for a maximum system bandwidth.

The downlink system bandwidth may be determined in step (b) by performing the non-coherent correlation at a plurality of possible bandwidths, and identifying the bandwidth at which the greatest correlation result is obtained.

Step (c) may be performed at a plurality of different RS shifts and slot numbers.

The number of transmit antennas may be determined in step (d) by identifying the transmit antenna at which the greatest correlation result is obtained.

Another aspect of the invention provides a communications device which performs non-coherent detection of the number of cell-specific transmit antenna ports, the device including:

an RS sequence generator for generating a downlink reference signals (RS) sequence replica;

a bandwidth determination block determining a downlink system bandwidth, for a first possible transmit antenna port only, from non-coherent correlation of the generated downlink RS sequence replica and received RS samples;

a correlation calculator for performing, at the determined downlink system, a correlation of the generated downlink RS sequence replica and received RS samples for each of a plurality of possible transmit antenna ports; and a correlation results comparator for determining the number of transmit antennas from a comparison of the correlation results carried out by the correlation calculator.

BRIEF DESCRIPTION OF THE DRAWINGS

Various aspects and features of the invention will be more fully understood with reference to the drawings, in which.

EXEMPLARY EMBODIMENT FOR CARRYING OUT THE INVENTION

Figure 1:
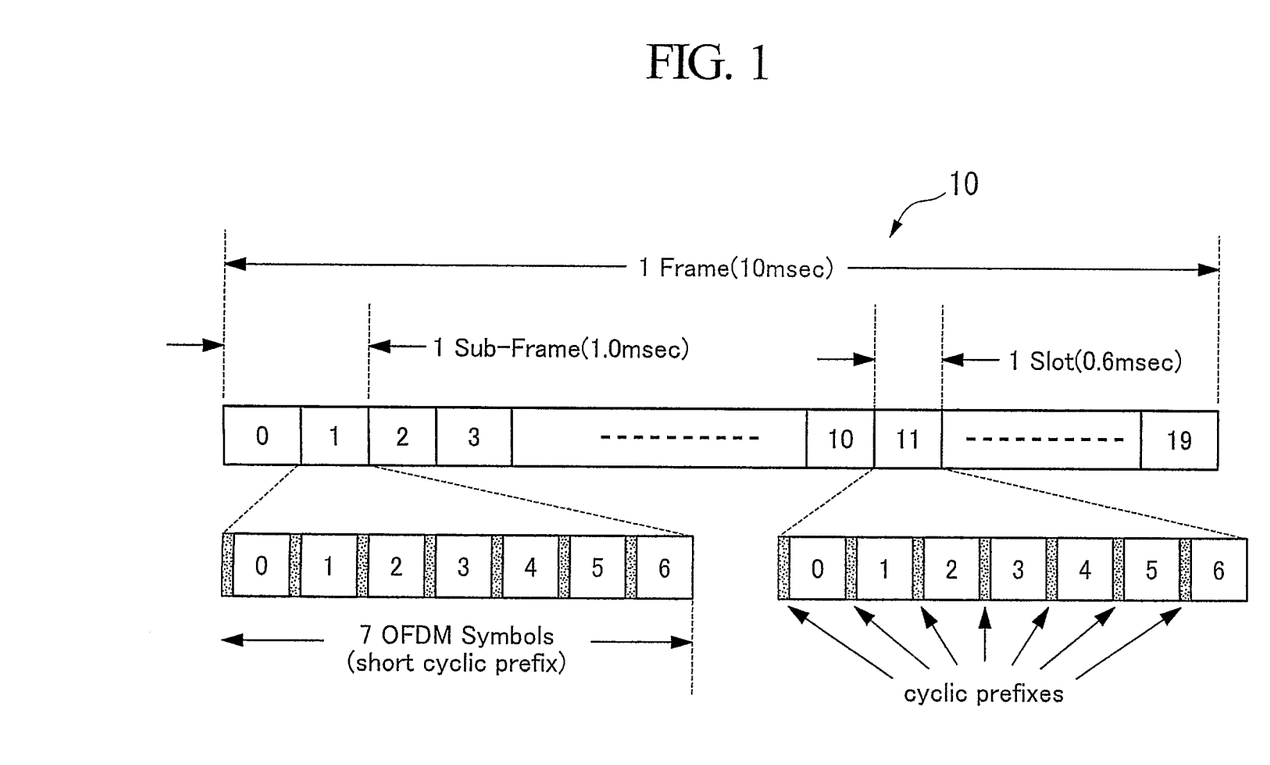
FIG. 1 is a schematic diagram detecting a frame structure for transmitting data in an OFDMA communication system.

In OFDMA systems, users are allocated a specific number of sub-carriers for a predetermined amount of time. These are referred to as physical resource blocks (PRBs) in the LTE specifications. PRBs have both time and frequency dimensions. Allocation of PRBs is handled by a scheduling function at a base station. FIG. 1 depicts the generic frame structure for transmitting data in an OFDMA system. As can be seen in this figure, an LTE frame 10 is 10 msec in duration. Each frame is divided into 10 subframes, each subframe being 1.0 msec long. Each subframe is further divided into two slots, each of 0.5 msec duration. Slots consist of either 6 or 7 OFDMA symbols, depending on whether a normal or extended cyclic prefix is employed.

The total number of available sub-carriers depends on the overall transmission bandwidth of the system. The LTE specifications define parameters for system bandwidths from 1.2 MHz to 20 MHz, as shown below in Table 1.

TABLE 1

| Bandwidth (MHz) | 1.25 | 3.0 | 5.0 | 10.0 | 15.0 | 20.0 |
|---|---|---|---|---|---|---|
| Subcarrier bandwidth (kHz) | | | | 15 | | |
| Physical resource block (PRB) bandwidth (kHz) | | | | 180 | | |
| Number of available PRBs | 6 | 15 | 25 | 50 | 75 | 100 |

Figure 2:
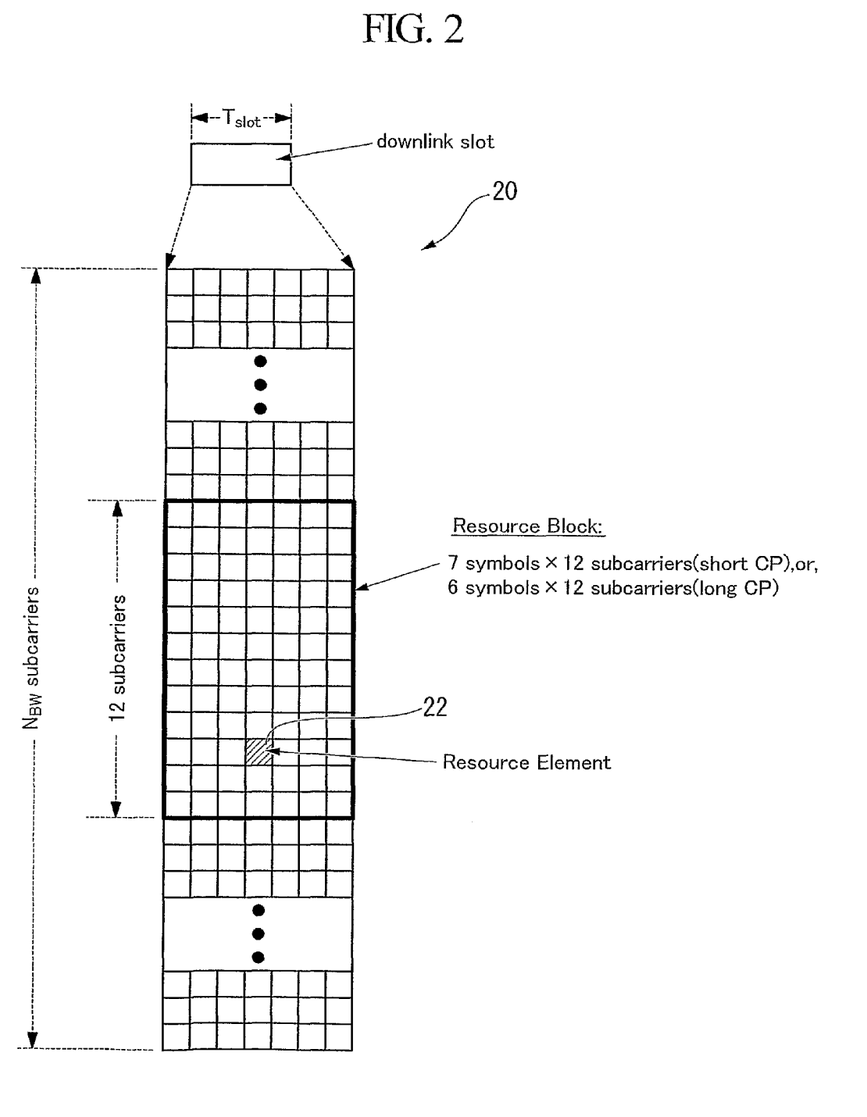
FIG. 2 is a schematic diagram illustrating a resource block for transmitting data in an OFDMA communication system.

A PRB is defined as consisting of 12 consecutive sub-carriers for one slot (0.5 msec) in duration. A PRB is the smallest element of resource allocation assignment made by a base station scheduler. A transmitted downlink signal consists of $N_{BW}$ sub-carriers for a duration of $N_{symb}$ OFDM symbols. This can be represented by a resource grid 20 as depicted in FIG. 2. Each box within the grid represents a single sub-carrier for one symbol period and is referred to as a resource element. One such resource element is reference 22 in FIG. 2. In multiple input multiple output applications, there is such a resource grid for each transmitting antenna.

Figure 3:
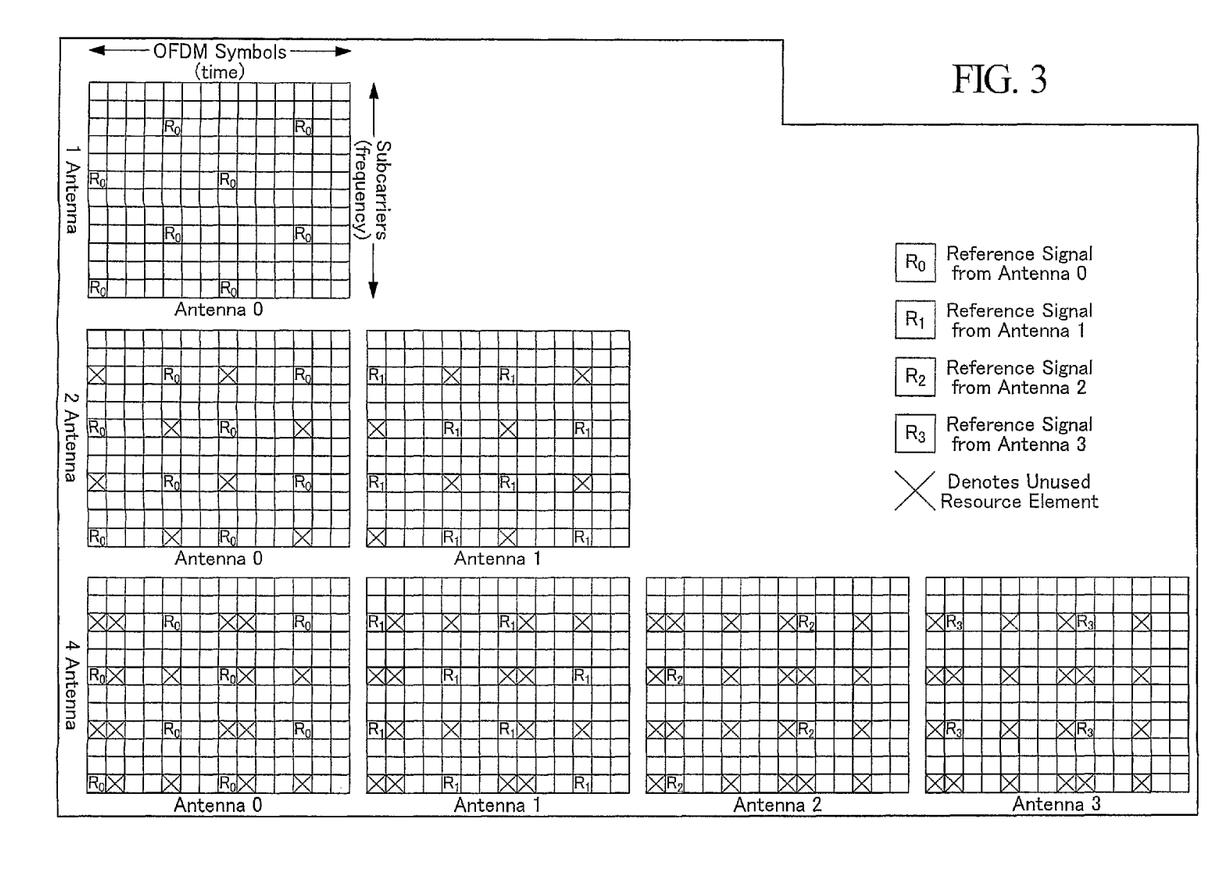
FIG. 3 is a schematic diagram illustrating the transmission of reference signals in resource blocks respectively using 1, 2 and 4 transmit antennas and forming part of an OFDMA communication system.

In contrast to packet oriented networks, LTE communication systems do not employ a physical layer preamble to facilitate carrier offset estimates, channel estimation, timing synchronization, etc. Instead, special reference signals are embedded in the PRBs, as shown in FIG. 3. These reference signals are transmitted during the first and fifth OFDM symbols of each slot when the normal cyclic prefix (CP) is used and during the first and fourth OFDM symbols when the extended CP is used. Reference symbols are transmitted every sixth sub-carrier. Further, reference symbols are staggered in both time and frequency. The channel response on sub-carriers bearing reference symbols can be computed directly. Interpolation is used to estimate the channel response on the remaining sub-carriers.

Multiple transceivers may be used at both the base station and mobile station or UE in order to enhance link robustness and to increase data aids for the LTE downlink. One technique used to increase system data rates in LTE communication systems is multiple-input multiple-output (MIMO). MIMO increases system data rates by using multiple antennas on both the transmitting and receiving ends. In order to successfully receive a MIMO transmission, the receiver must determine the channel impulse response from each transmitting antenna. In LTE, channel impulse responses are determined by sequentially transmitting known reference signals from each transmitting antenna.

Figure 4:
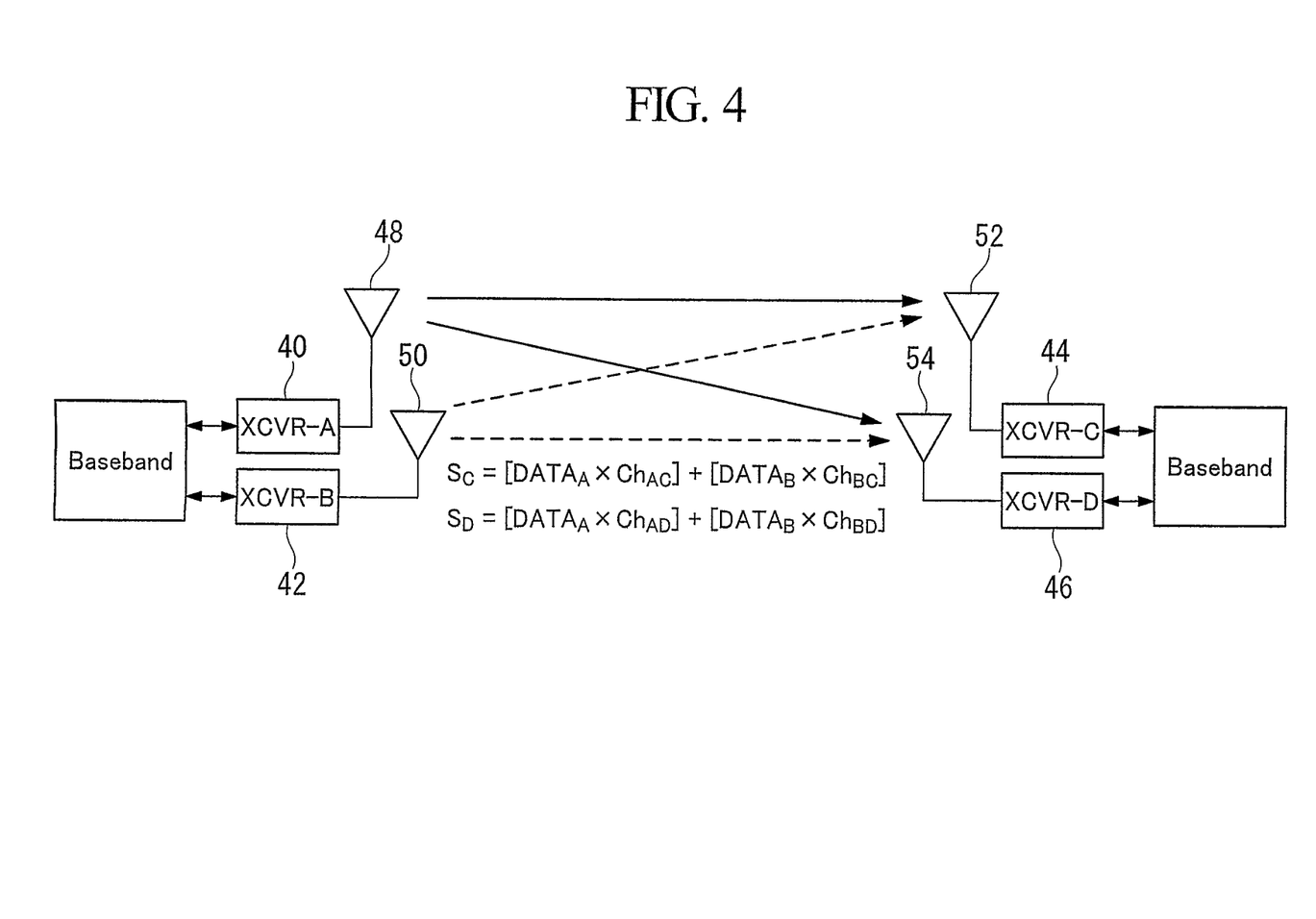
FIG. 4 is a schematic diagram of multiple transceivers at both a base station and communications device forming part of an OFDMA communication system with transmit diversity and using multiple transmit antennas.

FIG. 4 depicts an exemplary 2×2 MIMO system including four transceivers 40 to 46, each of which is equipped with a single antenna, respectively referenced 48 to 54. Accordingly, a total of 4 channel impulse responses are provided in this system. While one transmitter antenna is sending a reference signal, the other antenna is idle. Once the channel impulse responses are known, data can be transmitted by both antennas simultaneously. The combination of the two data streams at the two receiver antennas results in a set of two equations and two unknowns, which is resolvable into the two original data streams.

However, in order for this to occur, each transceiver must be able to detect the number of cell-specific transmit antenna ports. Whilst this would otherwise be blindly detected via PBCH demodulation and decoding, the present invention enables a communication device or UE to determine the number of cell-specific transmit antenna ports without PBCH processing.

Figure 5:
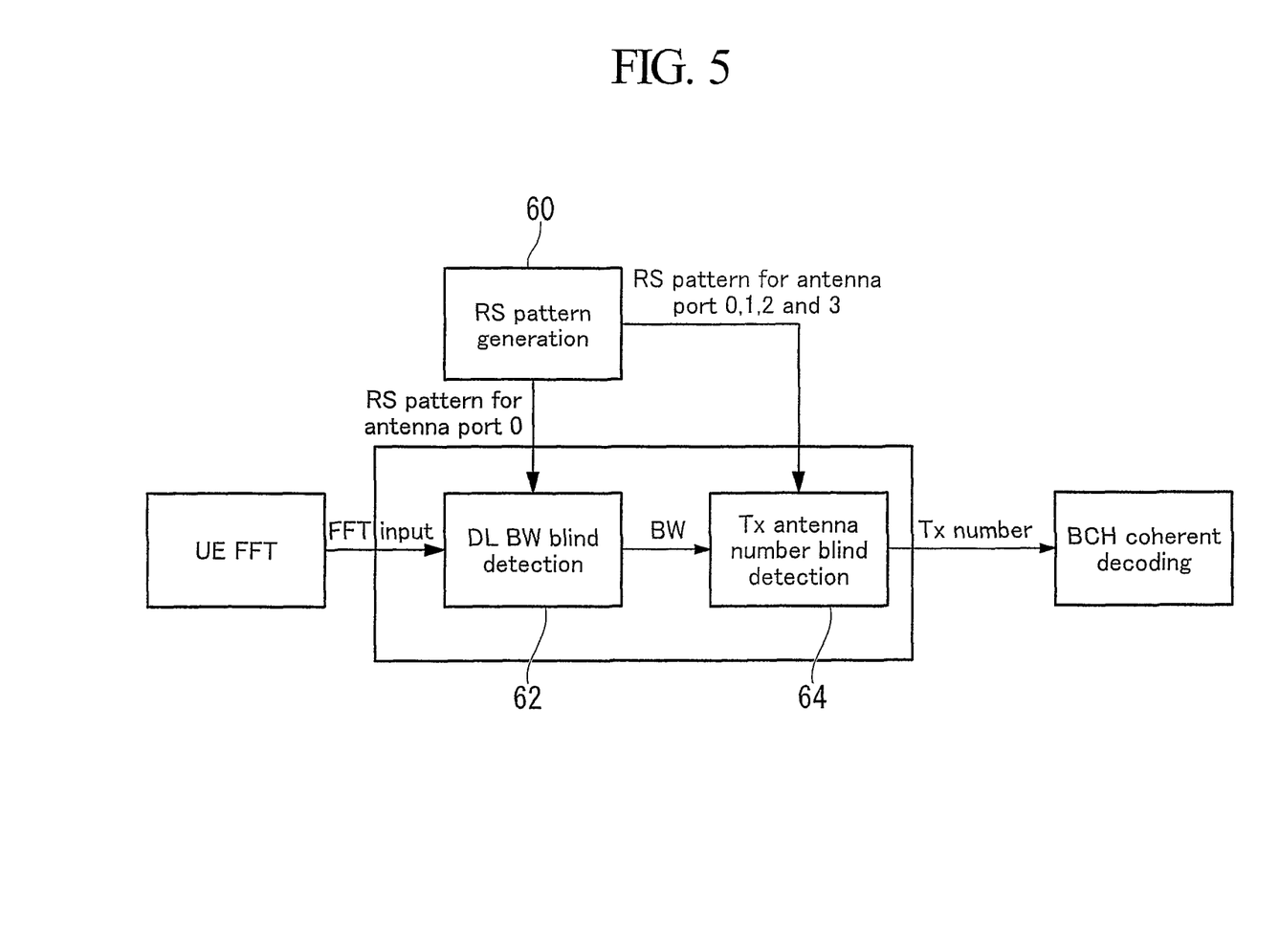
FIG. 5 is a schematic diagram of part of a communication device for detecting the number of cell-specific transmitting antenna ports in a communication device forming part of an OFDMA communication system.

As depicted in FIG. 5, the first step required in this process is to generate a downlink reference signal (RS) sequence replica for the maximum possible system bandwidth. As described in Section 6.10.1.1 of 3GPP TS 36.21, the RS sequence replica is defined by $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ is the slot number within a radio frame, l is the OFDM symbol number within the slot and $N_{RB}^{max,DL}$ is the largest downlink bandwidth configuration, expressed in the number of resource blocks (RB).

The pseudo-random sequence c(i) is defined in Section 7.2 of 3GPP TS 36.211. The pseudo-random sequence generator is initialized with $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

at the start of each OFDM symbol where $$N_{CP} = \begin{cases} 1 & \text{for normal } CP \\ 0 & \text{for extended } CP. \end{cases}$$

It will be appreciated that Cell ID and CP mode are already known to the UE from a conventional cell-searching process. The RS sequence replica generation is carried out by data processing block 60 shown in FIG. 5.

Secondly, data processing block 62 determines downlink system bandwidth from non-coherent correlation, for the first possible transmit antenna port only (that is, transmit antenna port 0), of the generated RS sequence replica and received RS samples at a number of possible bandwidths. The non-coherent correlation detection is performed only on the RS transmitted from transmit antenna port 0 as it is the only RS sequence that is guaranteed to exist. It will be understood that at this stage the RS shift, as specified in Section 6.10.1.1 of 3GPP TS 36.211, is already known to the UE as it is derived from the Cell ID obtained from the cell searching process.

The RS sequence that is actually transmitted from transmit antenna port 0 will vary depending upon the actual downlink system bandwidth, as defined in Section 6 6.10.1.2 of 3GPP TS 36.211. In the description which will now follow, $y_{l,s}^{(0)}$ (BW=x) is the vector of received RS samples at the UE, extracted from the received signal samples at receive antenna port 0 of the $l^{th}$ OFDM symbol, given the RS shift (s=$RS_{shift}^{(p=0)}$) described in Section 6.10.1.2 of 3GPP TS 36.211 and assuming the bandwidth is x MHz. $RS_{shift}^{(p=0)}$ denotes the RS offset for transmit antenna port 0. Moreover $\hat{r}_l$(BW=x) is the RS sequence replica generated at the UE by date processing block 60 assuming the bandwidth is x MHz.

The downlink system bandwidth is determined by $$\hat{x} = \underset{x}{\operatorname{argmax}} |y_{l,s}^{(0)}(BW=x) \cdot \hat{r}_l * (BW=x)|^2$$

where $(\cdot)^*$ is used to denote complex conjugate, $\hat{x}$ and x are 1.4 MHz, 3 MHz, 5 MHz, 10 Mhz, 15 MHz or 20 MHz. The foregoing equation applies in the case of UE with one receive antenna (e.g. as shown in FIG. 4), but for UE with two receive antennas, receive diversity can be exploited by calculating $$\hat{x} = \underset{x}{\operatorname{argmax}} |(y_{l,s}^{(0)}(BW=x) + y_{l,s}^{(1)}(BW=x)) \cdot \hat{r}_l * (BW=x)|^2.$$

Accordingly, a non-coherent correlation of the received RS samples at the UE and the RS sequence replica generated at the UE is carried out for all possible bandwidths listed in Table 1 above, and the downlink system bandwidth is thereby determined from the greatest calculated correlation value.

Figure 6:
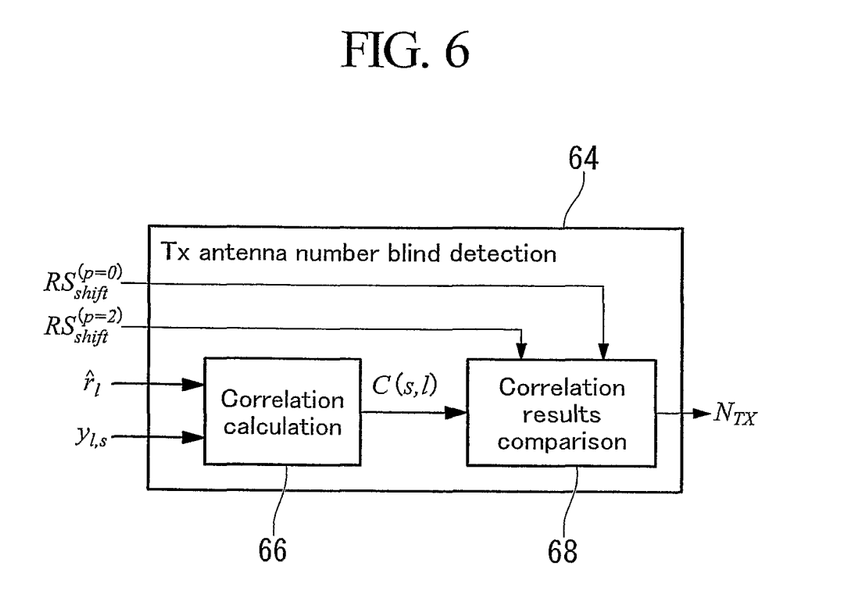
FIG. 6 is a schematic diagram showing one of the functional elements of the part of the communication device illustrated in FIG. 5.

Next, at the determined downlink system bandwidth and for all possible RS shifts and slot numbers, a correlation is performed by data processing block 64 (shown in FIG. 6) of the generated downlink RS sequence replica and received RS samples for all possible transmit antenna ports. The correlation C (s, l) is processed by data processing block 66 for all combinations of s and l regarding RS allocation for transmit antenna port 0, 1, 2 and 3, as shown in Section 6.10.11 of 3GPP TS36.211, according to the equation:

```
for (l=0; l<2; l++) {
    for (s=0; s<6; s++) {
        C(s,l) = |y_{l,s} •r̂_l*|^2
    }
}
``` where, s denotes the RS shift ranged from 0 to 5 as specified in Section 6.10.11 of 3GPP TS 36.211. The vector $\hat{r}_l$, is the RS sequence calculated in RS pilot pattern generation module given the system bandwidth determined by the processing block 62. The vector $y_{l,s}$ is obtained by extracting every six samples with the starting offset s from the received signal for OFDM symbol l since reference signals are transmitted every sixth subcarrier. Once again, the foregoing applies for UE with only one receive antenna port, but for UE with two receive antenna ports, $y_{l,s} = y_{l,s}^{(0)} + y_{l,s}^{(1)}$.

Finally, the number of transmit antenna ports is determined by data processing block 68 from a comparison of the results of the correlations. The correlation results comparison is processed based on the following criteria:

1. If RS sequence for antenna port 3 exists, RS pilots for antenna port 2, 1, 0 must exist.
2. If RS sequence for antenna port 1 exists, RS pilot for antenna port 0 must exist.
3. Antenna ports 0 and 1 have the same RS sequence in one OFDM symbol. Antenna ports 2 and 3 have the same RS sequence in one OFDM symbol.

Step 1:

Compare the correlation result of antenna port 0 $C(s=RS_{shift}^{(p=0)}, l=0)$ to other 4 correlation results $C(s \neq \{RS_{shift}^{(p=0)}, \mod(RS_{shift}^{(p=0)}+3,6)\}, l=0)$ (position $s=\mod(RS_{shift}^{(p=0)}+3,6)$ is excluded because RS pilot for antenna port 1 may exist here, which have the same RS sequence). If the correlation result of antenna port 0 is much larger than the other 4 positions, a decision can be drawn that antenna port 1 exists. Otherwise, the whole detection fails with no more further process because other antenna port 1, 2 or 3 cannot exist without antenna port 0.

Step 2:

Compare the correlation result of antenna port 1 $C(s=\mod(RS_{shift}^{(p=0)}+3,6), l=0)$ to other 4 correlation results $C(s \neq \{RS_{shift}^{(p=0)}, \mod(RS_{shift}^{(p=0)}+3,6)\}, l=0)$. If the correlation result of antenna port 1 is much larger than the other 4 positions, a decision can be drawn that antenna port 1 exists. This in turn means at least antenna port 0 and 1 exist. Otherwise, no more process is needed and a decision is drawn that there is only 1 transmit antenna.

Step 3:

Compare the correlation results of antenna port 2 and 3 to other 4 correlation results $C(s \neq \{RS_{shift}^{(p=0)}, \mod(RS_{shift}^{(p=0)}+3,6)\}, l=0)$. If both are much larger than the other 4 positions, a decision can be drawn that there are 4 transmit antennas. Otherwise, there are only 2 transmit antennas as a consequence of step 2. The general correlation $$C(s,l) = |y_{l,s}(0) \times \hat{r}_l^*(0) + y_{l,s}(1) \times \hat{r}_l^*(1) + \ldots + y_{l,s}(m-1) \times \hat{r}_l^*(m-1)|^2, \quad m=0,1,\ldots,2N_{RB}^{max,DL} \ldots 1$$

where $y_{l,s}(i)$ denotes the i-th element of the received signal sequence $y_{l,s}$ defined above and $\hat{r}_l(i)$ denotes the i-th element of the pilot sequence $\hat{r}_l$.

The above-described decision making process is implemented, in this example, by the following series of instructions:

```
If C(s = RS_shift^(p=0), l = 0 >> C(s ≠ {RS_shift^(p=0), mod(RS_shift^(p=0), + 3,6)}, l = 0)
    If C(s = mod(RS_shift^(p=0) + 3,6), l = 0) >> C(s ≠
        {RS_shift^(p=0), mod(RS_shift^(p=0) + 3,6)}, l = 0)
        If C(s = RS_shift^(p=2), l = 1) >> C(s ≠
            {RS_shift^(p=2), mod(RS_shift^(p=2) +3,6)}, l = 1) and
        If
    C(s = mod(RS_shift^(p=2) + 3,6), l = 1) >> C(s ≠
        {RS_shift^(p=2), mod(RS_shift +3,6)}, l = 1)
            Number of TX antenna ports is FOUR
        Else
            Number of TX antenna ports is TWO
        End
    else
        Number of TX antenna ports is ONE
    end
else
    Fail to detect the number of Tx antenna ports
end
``` where $RS_{shift}^{(p=0)}$ denotes the RS offset for Tx antenna port 2, which are derived from Section 6.10.12 of 3GPP TS 36.211. $N_{TX}$ denotes detection result for the number of transmit antennas if detection is successful.

Only processing of one slot is described above, to improve the probability of correct detection, time diversity can be exploited by processing multiple slots.

Whilst the present invention has been described in conjunction with a limited number of embodiments, it will be apparent to those skilled in the art that many alternatives, modifications and variations are possible in light of the foregoing description. Accordingly, the present invention is intended to embrace all such alternatives, modifications and variations as made forthwith in the spirit and scope of the invention as disclosed.

INDUSTRIAL APPLICABILITY

The present invention can be applied to orthogonal frequency division multiple access (OFDMA) communications system such as the Long Term Evolution (LTE) communication system. The present invention can also be applied in particular to the determination by a communication device such as User Equipment (UE) forming part of an LTE communication system of the number of cell-specific antenna ports of the serving cell in communication with the UE.

The invention claimed is:

1. A method of non-coherent detection of the number of cell-specific transmit antenna ports for a communications device, the method including the steps of, at the communications device:
 (a) generating a downlink reference signals (RS) sequence replica;
 (b) for a first possible transmit antenna port only, determining a downlink system bandwidth from non-coherent correlation of the generated downlink RS sequence replica and received RS samples;
 (c) at the determined downlink system, performing a correlation of the generated downlink RS sequence replica and received RS samples for each of a plurality of possible transmit antenna ports; and
 (d) determining the number of transmit antennas from a comparison of the correlation results in step (c).

2. A method according to claim 1, wherein the RS sequence replica is generated in step (a) for a maximum system bandwidth.

3. A method according to claim 1, wherein the downlink system bandwidth is determined in step (b) by performing the non-coherent correlation at a plurality of possible bandwidths, and identifying the bandwidth at which the greatest correlation result is obtained.

4. A method according to claim 1, wherein step (c) is performed at a plurality of different RS shifts and slot numbers.

5. A method according to claim 1, wherein the number of transmit antennas is determined in step (d) by identifying the transmit antenna at which the greatest correlation result is obtained.

6. A communications device which performs non-coherent detection of the number of cell-specific transmit antenna ports, the device including:
 an RS sequence generator for generating a downlink reference signals (RS) sequence replica;
 a bandwidth determination block determining a downlink system bandwidth, for a first possible transmit antenna port only, from non-coherent correlation of the generated downlink RS sequence replica and received RS samples;
 a correlation calculator for performing, at the determined downlink system, a correlation of the generated downlink RS sequence replica and received RS samples for each of a plurality of possible transmit antenna ports; and
 a correlation results comparator for determining the number of transmit antennas from a comparison of the correlation results carried out by the correlation calculator.

7. A method according to claim 2, wherein the downlink system bandwidth is determined in step (b) by performing the non-coherent correlation at a plurality of possible bandwidths, and identifying the bandwidth at which the greatest correlation result is obtained.

8. A method according to claim 2, wherein step (c) is performed at a plurality of different RS shifts and slot numbers.

9. A method according to claim 3, wherein step (c) is performed at a plurality of different RS shifts and slot numbers.

10. A method according to claim 2, wherein the number of transmit antennas is determined in step (d) by identifying the transmit antenna at which the greatest correlation result is obtained.

11. A method according to claim 3, wherein the number of transmit antennas is determined in step (d) by identifying the transmit antenna at which the greatest correlation result is obtained.

12. A method according to claim 4, wherein the number of transmit antennas is determined in step (d) by identifying the transmit antenna at which the greatest correlation result is obtained.

* * * * *

UNITED STATES PATENT AND TRADEMARK OFFICE
CERTIFICATE OF CORRECTION

PATENT NO.        : 8,514,803 B2
APPLICATION NO.  : 13/148493
DATED             : August 20, 2013
INVENTOR(S)       : Lin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 163 days.

Signed and Sealed this
Fifteenth Day of September, 2015

Michelle K. Lee
*Director of the United States Patent and Trademark Office*